United States Patent
Ahonen et al.

(10) Patent No.: US 9,587,640 B2
(45) Date of Patent: Mar. 7, 2017

(54) METHOD FOR IMPROVING SENSORLESS FLOW RATE ESTIMATION ACCURACY OF PUMP DRIVEN WITH FREQUENCY CONVERTER

(75) Inventors: Tero Ahonen, Lappeenranta (FI); Jero Ahola, Lappeenranta (FI); Jussi Tamminen, Lappeenranta (FI)

(73) Assignee: ABB Technology Oy, Helsinki (FI)

( * ) Notice: Subject to any disclaimer, the term of this patent is extended or adjusted under 35 U.S.C. 154(b) by 1157 days.

(21) Appl. No.: 13/408,823

(22) Filed: Feb. 29, 2012

(65) Prior Publication Data
US 2012/0251340 A1    Oct. 4, 2012

(30) Foreign Application Priority Data

Mar. 29, 2011   (EP) .................................... 11160200

(51) Int. Cl.
F04D 15/00    (2006.01)
G01F 25/00    (2006.01)
G01F 1/80     (2006.01)

(52) U.S. Cl.
CPC ........... *F04D 15/0088* (2013.01); *G01F 1/80* (2013.01); *G01F 25/003* (2013.01)

(58) Field of Classification Search
CPC  F04D 15/0088; F04D 27/001; G05B 13/0265
(Continued)

(56) References Cited

U.S. PATENT DOCUMENTS 6,591,697 B2 *  7/2003  Henyan ..................... 73/861.71
6,918,307 B2    7/2005  Ohlsson et al.
(Continued)

FOREIGN PATENT DOCUMENTS

DE         103 59 726 A1    7/2005
DE    10 2007 010 768 A1    9/2007

OTHER PUBLICATIONS

Ahonen et al., "Estimation of pump operational state with model-based methods," Journal of Energy Conversion and Management 51 (2010) 1319-1325, published (available online) Feb. 4, 2010.*

(Continued)

*Primary Examiner* — Patrick Hamo
(74) *Attorney, Agent, or Firm* — Taft Stettinius & Hollister LLP

(57) ABSTRACT

An exemplary method for determining a flow rate of a pump, includes measuring and storing the flow rate ($Q_{Mean}$) when the pump is in operation, storing rotational speed ($n_{Mean}$) and torque ($T_{Mean}$) of the pump during measurement of the flow rate ($Q_{Mean}$), determining torque ($T_{Manufacturer}$) corresponding to the measured flow rate ($Q_{Mean}$), calculating a bias value of the torque ($T_{Bias}$) by comparing the torque determined from the characteristic curve ($T_{Manufacturer}$) and the stored torque ($T_{Mean}$) of the pump, and determining an operating point of the pump based on the bias value of the torque ($T_{Bias}$).

16 Claims, 10 Drawing Sheets

(58) Field of Classification Search
USPC ........ 417/45, 53; 73/168; 700/282; 702/182, 702/183
See application file for complete search history.

(56) References Cited

U.S. PATENT DOCUMENTS

| | | |
|---|---|---|
| 2003/0129062 A1 | 7/2003 | Sabini et al. |
| 2007/0185661 A1* | 8/2007 | Venkatachari et al. ......... 702/45 |
| 2007/0212210 A1 | 9/2007 | Kernan et al. |
| 2007/0212229 A1* | 9/2007 | Stavale et al. .................. 417/42 |
| 2010/0150737 A1 | 6/2010 | Anderson et al. |
| 2011/0106452 A1 | 5/2011 | Anderson et al. |

OTHER PUBLICATIONS

Sulzer Pumps, "Sulzer Centrifugal Pump Handbook," 2nd. Ed., 1998, pp. 62-63.*
European Search Report issued on Jun. 24, 2011 for Application No. 11160200.9.
Office Action issued on Mar. 31, 2014, by the Chinese Patent Office in corresponding Chinese Patent Application No. 201210083774, and an English Translation of the Office Action. (14 pages).

* cited by examiner

METHOD FOR IMPROVING SENSORLESS FLOW RATE ESTIMATION ACCURACY OF PUMP DRIVEN WITH FREQUENCY CONVERTER

RELATED APPLICATION(S)

This application claims priority under 35 U.S.C. §119 to European Patent Application No. 11160200.9 filed in Europe on Mar. 29, 2011, the entire content of which is hereby incorporated by reference in its entirety.

FIELD

The present disclosure relates to pumps, such as driven by frequency converters and more particularly to improving the accuracy of flow rate calculation of pumps driven by frequency converters.

BACKGROUND INFORMATION

Pumping of fluids is specified in many processes. Often the most efficient way to control pump operation is using a frequency converter for driving the motor of the pump at a certain speed. Especially if the flow rate of the fluid is changed in a process, the use of a frequency converter provides the most economic control method for the pumping process.

Pump operating point location (flow rate $Q_v$, head H) can be estimated by utilizing a frequency converter's torque and rotational speed estimates for an electric motor ($T_{est}$ and $n_{est}$, respectively), pump characteristic curves given by the pump manufacturer, and affinity laws. Thus, the actual flow of the pumped fluid does not have to be measured for obtaining information on the operating point.

FIG. 1 illustrates an example of characteristic curves of a pump in accordance with a known embodiment. In particular, FIG. 1 shows an example of QH and QT curves and a method referred to as QT calculation. The principle of QT calculation is presented in U.S. Pat. No. 6,918,307 B2 in more detail. The pump manufacturer usually gives two curves: flow rate to head curve and flow rate to power curve. These curves can be used to produce a flow rate to torque curve which can be used to estimate the flow rate produced by the pump with the torque and rotational speed estimates of a frequency converter.

FIG. 1 shows the operating point estimation with the pump characteristic curves and the estimates of the frequency converter on rotational speed and torque. The flow rate Q produced by the pump can be determined from the lower curve when the pump shaft torque T is known. Then the head H produced by the pump can be read from the upper curve using the determined flow rate. Since the pump manufacturers usually give the characteristic curves only at one (e.g., nominal) rotational speed of the pump, the curves have to be changed to present rotational speed, as in the example of FIG. 1. This transformation of the curves can be carried out using affinity laws, as will be described later.

The accuracy of the estimation method is highly dependable on the accuracy of the pump characteristic curves. This factor limits the applicability of the QT calculation method for the estimation of the pump operating point location.

Currently, the QT calculation is based solely on the characteristic curves provided by the manufacturer, which can cause erroneous results, if the curves are not validated at all. Usually the torque consumed by the pump has a static or linear difference (bias) compared with the manufacturer's QT curve. For example, this difference can be caused by an improper assembly of the pump, manufacturing tolerances of the pump, pumped liquid, decreased efficiency due to the wearing of the pump, and characteristic curve measurement inaccuracies.

Document US 2007/0212210 A1 discloses a method of improving the accuracy of QT calculation. In this method the pump is operated against a closed discharge valve at several rotational speeds to determine the QT curve inaccuracy. However, when the pump is driven against a closed discharge valve, it does not produce flow. Instead it is in the harmful operating point, in which the pump does not normally operate. Hence, the closed valve test may specify interruption of the process, since pumps can be driven to provide flow in the process. This means that the prior art method is based on the use of a harmful and abnormal operating point of the pump.

SUMMARY

An exemplary method in connection with a pump driven with a frequency converter is disclosed, comprising: a) measuring and storing a flow rate ($Q_{Mean}$) when the pump is in operation; b) storing a used rotational speed ($n_{Mean}$) and torque ($T_{Mean}$) of the pump during measurement of the flow rate ($Q_{Mean}$), which rotational speed and torque are provided with the frequency converter; c) determining from a characteristic curve that is transformed into stored rotational speed ($n_{Mean}$), a predetermined torque ($T_{Manufacturer}$) corresponding to the measured flow rate ($Q_{Mean}$); d) calculating a bias value of the torque ($T_{Bias}$) by comparing the predetermined torque of the characteristic curve ($T_{Manufacturer}$) and the stored torque ($T_{Mean}$) of the pump; and e) determining an operating point of the pump based on the bias value of the torque ($T_{Bias}$).

An exemplary method of calculating flow rate of a pump is disclosed, comprising: a) measuring and storing a flow rate ($Q_{Mean}$) when the pump is in operation; b) storing rotational speed ($n_{Mean}$) and torque ($T_{Mean}$) of the pump during measurement of the flow rate ($Q_{Mean}$); c) determining a predetermined torque corresponding to the measured flow rate ($Q_{Mean}$) d) calculating a bias value of the torque ($T_{Bias}$) by comparing the predetermined torque of the characteristic curve ($T_{Manufacturer}$) and the stored torque ($T_{Mean}$) of the pump; and e) determining an operating point of the pump based on the bias value of the torque ($T_{Bias}$).

BRIEF DESCRIPTION OF THE DRAWINGS

In the following, the disclosure will be described in greater detail by means of exemplary embodiments and with reference to the attached drawings, in which.

DETAILED DESCRIPTION

An object of the present disclosure is thus to provide a method so as to overcome the above shortcoming in improving the accuracy of the estimation of the operating point of a pump. The object of the disclosure is achieved by a method which is characterized by what is stated in the independent claim. Exemplary embodiments of the disclosure are disclosed in the dependent claims.

The disclosure is based on the idea of using a temporary flow measurement device to measure the flow rate produced by the pump during its normal operation. The measured flow rate together with the estimates obtained from the frequency converter can be used to correct the QT curve.

An advantage of the method of the disclosure is that the estimation of the operating point of the pump can be greatly improved. The method does not specify that the pump is operated in specific operating points, such as against a closed discharge valve. Further, the correction is easy to accomplish and it can be made part of a normal inspection routine of the process.

Figure 1:
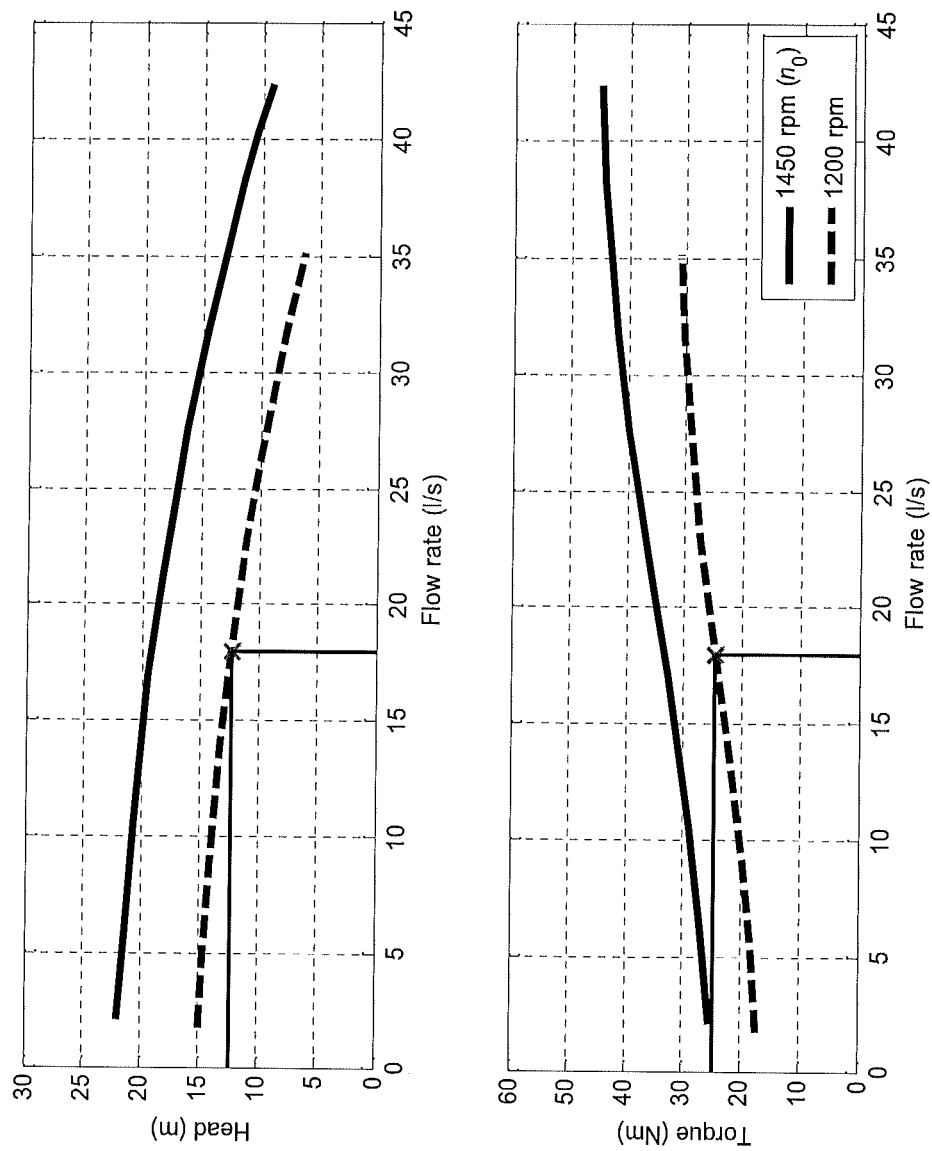
FIG. 1 illustrates an example of characteristic curves of a pump in accordance with a known embodiment.

As already mentioned, FIG. 1 discloses characteristic curves of a pump. These curves or the information needed to construct these curves can be provided by the pump manufacturer. A frequency converter that controls the pump provides estimates for the rotational speed of the pump and the torque provided by a motor to the shaft of the pump. In the following, the disclosure is described with reference to the flowchart of FIG. 10.

Figure 10:
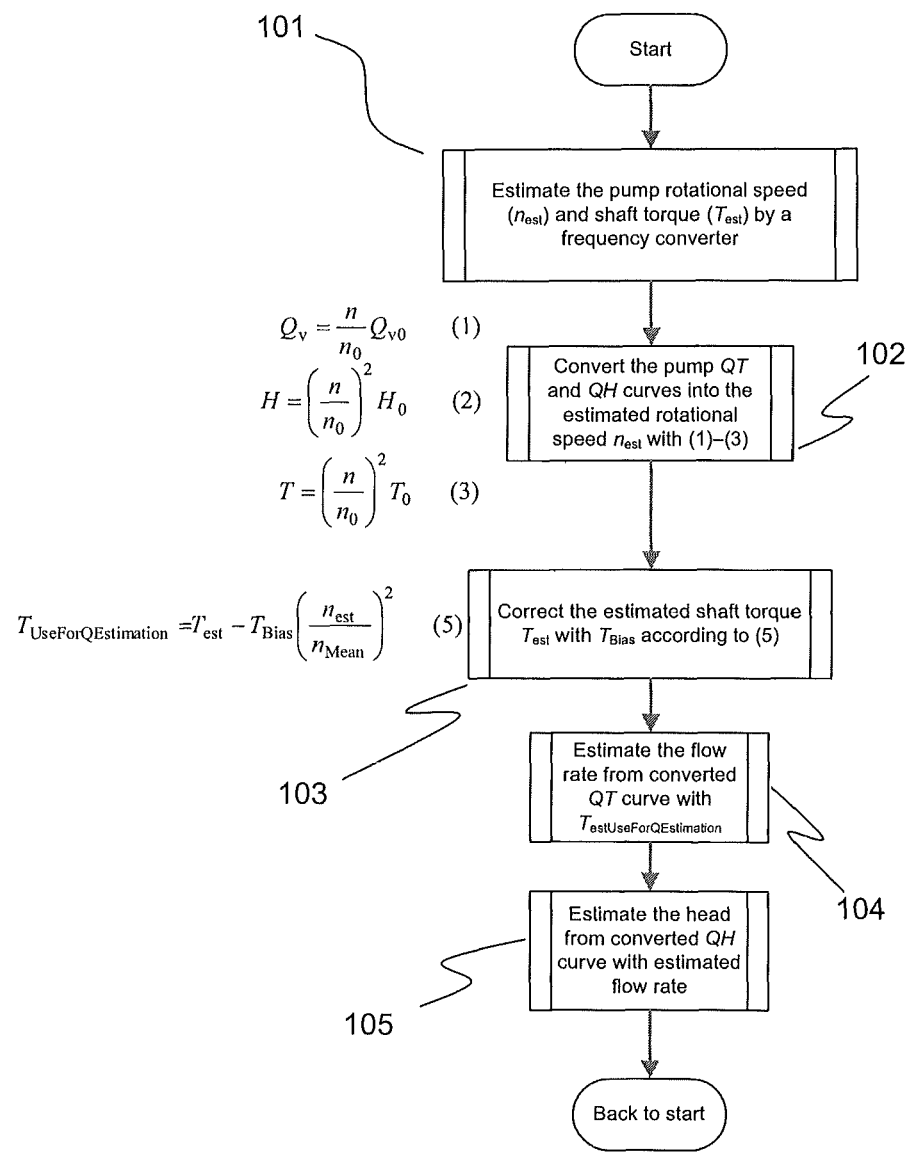
FIG. 10 shows a flow chart for measuring flow rate in accordance with an exemplary embodiment of the present disclosure.

FIG. 10 shows a flow chart for measuring flow rate in accordance with an exemplary embodiment of the present disclosure. The measurement can be carried out using a non-intrusive measurement device. This kind of device can be used for measuring the flow rate in a pipe outside of the pipe without disturbing the process itself. The measurement device may be a portable ultrasonic flow meter, for example.

At the same time as the flow rate is measured, the torque $T_{est}$ provided by the motor and rotational speed $n_{est}$ of the pump are estimated (101) and stored using the frequency converter. The measurement time should be sufficient, for example five seconds per measurement, so true mean values for the measurements and estimates can be determined. Also, no significant change in the rotational speed or valve positions should occur in this period of time. The determined mean values are later referred to as $T_{Mean}$, $n_{Mean}$, and $Q_{VMean}$. In practice, a longer measurement or several measurements could be carried out, from which a time period with applicable mean values for torque $T_{Mean}$, rotational speed $n_{Mean}$ and flow rate $Q_{VMean}$ could be selected to determine the QT curve inaccuracy.

For synchronizing the measurement and the estimates, time labels for $T_{Mean}$, $n_{Mean}$ and $Q_{VMean}$ are stored. After the measurement, flow rates can be transferred to the frequency converter manually by inputting the measurement results via a keyboard or automatically by means of a communications interface in order to correct the characteristics curves of the pump.

The manufacturer gives the pump characteristic curves for a specific rotational speed. These curves are converted (102) to the mean rotational speed acquired in the measurement section. The curves can be converted using the generally known affinity laws $$Q_v = \frac{n}{n_0} Q_{v0} \tag{1}$$

$$H = \left(\frac{n}{n_0}\right)^2 H_0 \tag{2}$$

$$T = \left(\frac{n}{n_0}\right)^2 T_0 \tag{3}$$

where $Q_v$, is the flow rate, H is the pump head, T is the pump torque, n is the instantaneous rotational speed (e.g. $n_{Mean}$), and the subscript 0 denotes the initial values of pump characteristic curves. Thus, $n_0$ denotes the nominal rotational speed of the pump.

When the flow rate produced by the pump has been measured, and the estimates for the rotational speed and shaft torque are known for the same time instant or period of the flow rate measurement, accuracy of the pump characteristic curves can be determined. By utilizing the characteristic curves converted for the instantaneous rotational speed, the torque $T_{Manufacturer}$ corresponding to the mean value of the measured flow rate $Q_{VMean}$ can be determined. This is compared with the measured value of torque $T_{Mean}$ in order to determine the bias torque $T_{Bias}$ for the characteristic curve $$T_{Bias} = T_{Mean} - T_{Manufacturer}. \tag{4}$$

This bias torque $T_{Bias}$ is then used to improve the estimation from torque to flow either by manipulating $T_{est}$ used for the estimation of the pump flow rate, or by manipulating the published QT curve. In the exemplary embodiment, $T_{est}$ is manipulated with $T_{Bias}$.

During normal operation, the frequency converter gives estimates for the torque $T_{est}$. According to the exemplary embodiment, this value is adjusted (103) so that it takes into account the bias in the manufacturer's characteristic curves. Instead of using $T_{est}$ for the flow rate estimation, variable $T_{UseForQEstimation}$ is applied for this purpose (104), (105), which can be calculated for instance with $$T_{UseForQEstimation} = T_{est} - T_{Bias}\left(\frac{n_{est}}{n_{Mean}}\right)^2 \tag{5}$$

where $n_{est}$ is the instantaneous rotational speed given by the frequency converter and $n_{Mean}$ is the rotational speed where $T_{bias}$ has been evaluated. In other words, the torque used for the estimation is scaled to the right rotational speed level instead of the curves.

If the flow rate measurement can be carried out for several (i.e., two or more) operating points of the pump, for instance a linear correction can be performed for the pump characteristic curve or for the estimated torque $T_{est}$. In an exemplary embodiment of the present disclosure, the linear correction is based on determining the equation for $T_{Bias}$ as a function of $T_{est}$, and by applying it to (5). In the following exemplary equations, $T_{Bias1}$ and $T_{Bias2}$ have been determined at the mean torques $T_{Mean1}$ and $T_{Mean2}$, and $T_{Mean2}$ is assumed to be larger than $T_{Mean1}$ $$T_{Bias} = \frac{T_{Bias2} - T_{Bias1}}{T_{Mean2} - T_{Mean1}} \cdot (T_{est} - T_{Mean1}) + T_{Bias1} \quad (6)$$

Equation (6) is basically a first order function for a straight line going through points $T_{Bias1}$ and $T_{Bias2}$ as $T_{est}$ changes.

Alternatively, several determined values of $T_{Bias}$ (i.e., $T_{Bias1}, T_{Bias2}, \ldots T_{Biasn}$) can be applied to calculate a mean value that is used for the correction of $T_{est}$ $$T_{Bias} = \frac{1}{n}\sum_{i=1}^{n} T_{Biasn} \quad (7)$$

Besides the manipulation of $T_{est}$, $T_{Bias}$ can be used to adjust the published QT curve of the pump, which initial values are denoted with the subscript 0. Magnitude of $T_{Bias}$ can be determined similarly as explained above for the exemplary embodiment [equations (4), (6), and (7)]. When $T_{Bias}$ is known at a certain rotational speed $n_{Mean}$, corrected values for the shaft torque of the QT curve ($T'_0$) can be defined with:

$$T'_0 = T_0 + T_{Bias} \cdot \left(\frac{n_0}{n_{Mean}}\right)^2 \quad (8)$$

As mentioned, the relationship between the shaft torque and the produced flow rate is presented with a QT curve (FIG. 1). The pump manufacturer can give the characteristic curves only at the nominal rotational speed of the pump. If the pump is operated at a different rotational speed, the QT curve must be converted to the present speed using affinity laws before the flow rate estimation. The affinity laws for torque and flow rate are given in the equations (1) and (3). After this conversion, the flow rate of the pump can be determined from the QT curve. In the case of the exemplary embodiment of the disclosure, a corrected torque value ($T_{UseForQEstimation}$) is used to determine the pump flow rate $Q_v$.

The method was evaluated by utilizing data collected with laboratory measurements. Laboratory measurements were conducted with a Sulzer APP 22-80 centrifugal pump, an 11 kW induction motor, and an ABB ACS 800 series frequency converter. The pump has a radial-flow impeller with a 255 mm impeller, and the internal clearance between the impeller and suction side of the pump can be adjusted without opening the pump. Motor and pump are connected to each other by a Dataflex 22/100 speed and torque measurement shaft which has a torque measurement accuracy of 1 Nm. The pump operating point location was determined with Wika absolute pressure sensors for the head and a pressure difference sensor across the venture tube, which equals the pump flow rate. In addition, a portable ultrasonic flow meter (Omega FD613) was used in the measurements, and its accuracy was verified with a separate measurement sequence.

The pump is located in a process, which includes (e.g., consists of) two water containers, valves, and alternative pipe lines. The shape of the characteristic curve of the process and the resulting operating point location can be modified by adjusting the valves in the pipe lines.

Firstly, characteristic curves of the Sulzer pump were determined for the QT calculation function: since the characteristic curves have been published only for 250 and 266 mm impeller diameters, the QH and QT characteristic curves of the pump had to be determined from the 250 mm curves by affinity equations for the impeller having a constant geometry ($Q_v \sim d^3$, $H \sim d^2$, $T \sim d^4$)

$$Q_V = \left(\frac{d}{d_0}\right)^3 \cdot Q_{V0} \quad (9)$$

$$H = \left(\frac{d}{d_0}\right)^2 H_0 \quad (10)$$

$$T = \left(\frac{d}{d_0}\right)^4 T_0 \quad (11)$$

Figure 2:
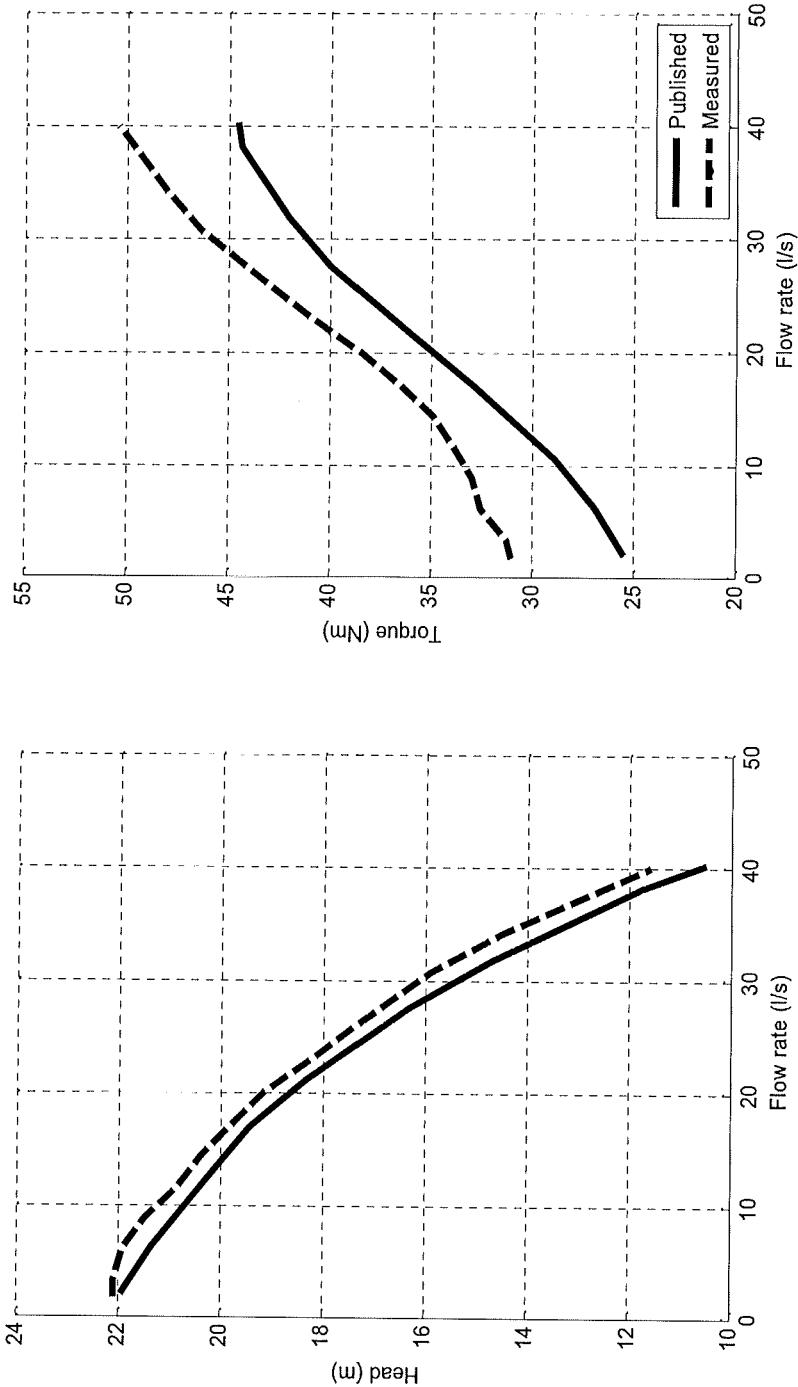
FIG. 2 illustrates published and measured characteristic curves of a pump in accordance with a known embodiment.

Then, a measurement series was conducted to determine the accuracy of the published pump characteristic curves. The pump was driven at a 1450 rpm rotational speed, and the operating point location was modified with the valves. The pump head, flow rate, rotational speed, and shaft torque were measured in 13 different operating point locations. In addition, the estimates calculated by the frequency converter for the rotational speed and shaft torque were stored for each operating point location. The pump had the same clearance setting as new, meaning that the internal clearances of the pump were in the factory settings during this measurement series. FIG. 2 illustrates published and measured characteristic curves of a pump in accordance with a known embodiment. In FIG. 2, the measurement results are illustrated together with the published characteristics of the pump. In the example results of FIG. 2, the published curves are the lower ones and the measured the upper ones.

As shown in FIG. 2 notable differences between the measured and published characteristics for the pump torque specification as a function of flow rate are notable. In practice, the error of the published torque curve leads to erroneous estimation results for the pump flow rate. For instance, at the shaft torque of 38 Nm, the published characteristic curve would result in a flow rate of 24.7 l/s, when the actual flow rate is 19.3 l/s. In practice, the estimation error for the flow rate is at least 5.4 l/s (≈19% of the pump's best efficiency flow rate $Q_{VBEP}$ 28 l/s at 1450 rpm).

To ensure the accuracy of the estimated shaft torque values calculated by the frequency converter, a comparison was carried out for the published, measured, and estimated shaft torques of the pump. The results are shown in FIG. 3.

Figure 3:
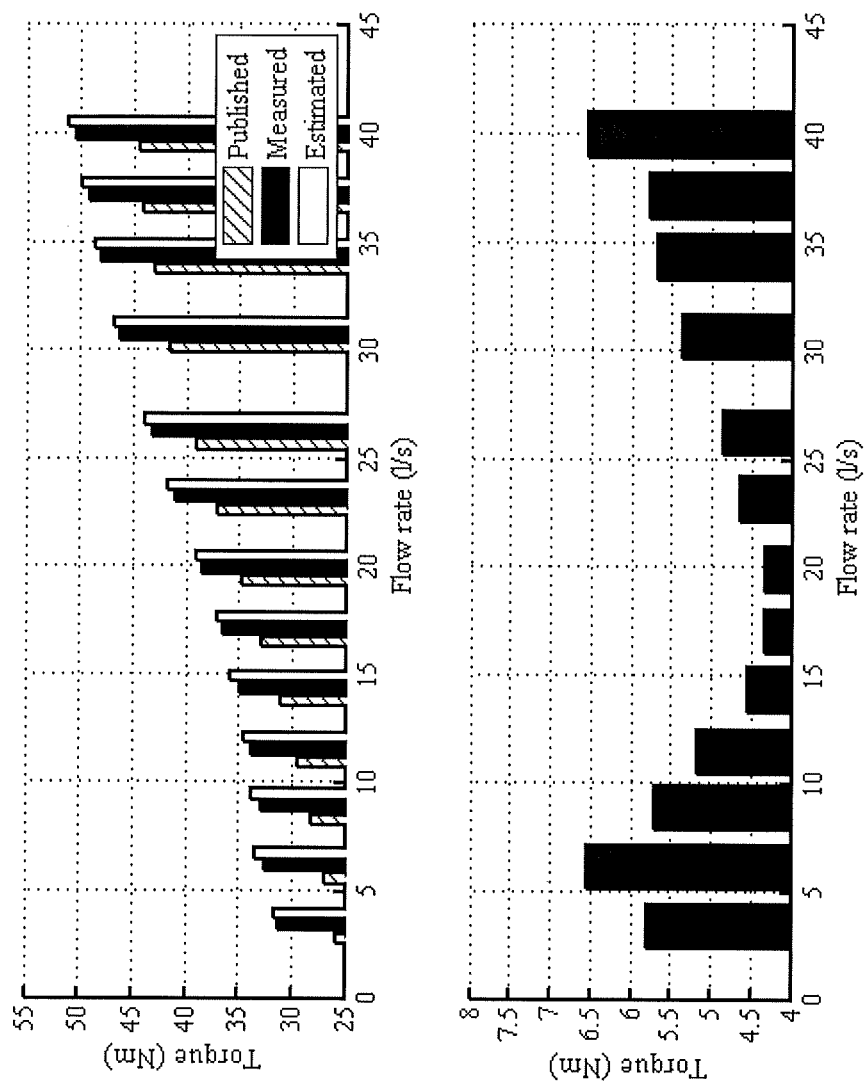
FIG. 3 shows published, measured, and estimated values of the shaft torque as function of the pump flow rate in accordance with an exemplary embodiment of the present disclosure.

FIG. 3 shows published, measured, and estimated values of the shaft torque as function of the pump flow rate in accordance with an exemplary embodiment of the present disclosure. The difference of the published and estimated shaft torques is 4.3-6.5 Nm depending on the pump flow rate. On the other hand, the difference between the measured and estimated shaft torques is less than 1 Nm, stating the applicability of the shaft torque estimates in the flow calculation. In the upper plot of FIG. 3, the published values are the leftmost bars, the measured values are the bars in the middle and the estimated values are presented as the rightmost bars at each flow rate.

From the results shown in FIG. 3, a torque difference at the flow rate of 26 l/s was selected as the bias value for the shaft torque. Hence $T_{Bias}$=4.86 Nm, which is applied to correct the estimated values of the shaft torque by applying (4). After this, QT estimation was carried out with $T_{Bias}$ correction for $T_{est}$ and also without corrections.

Figure 4:
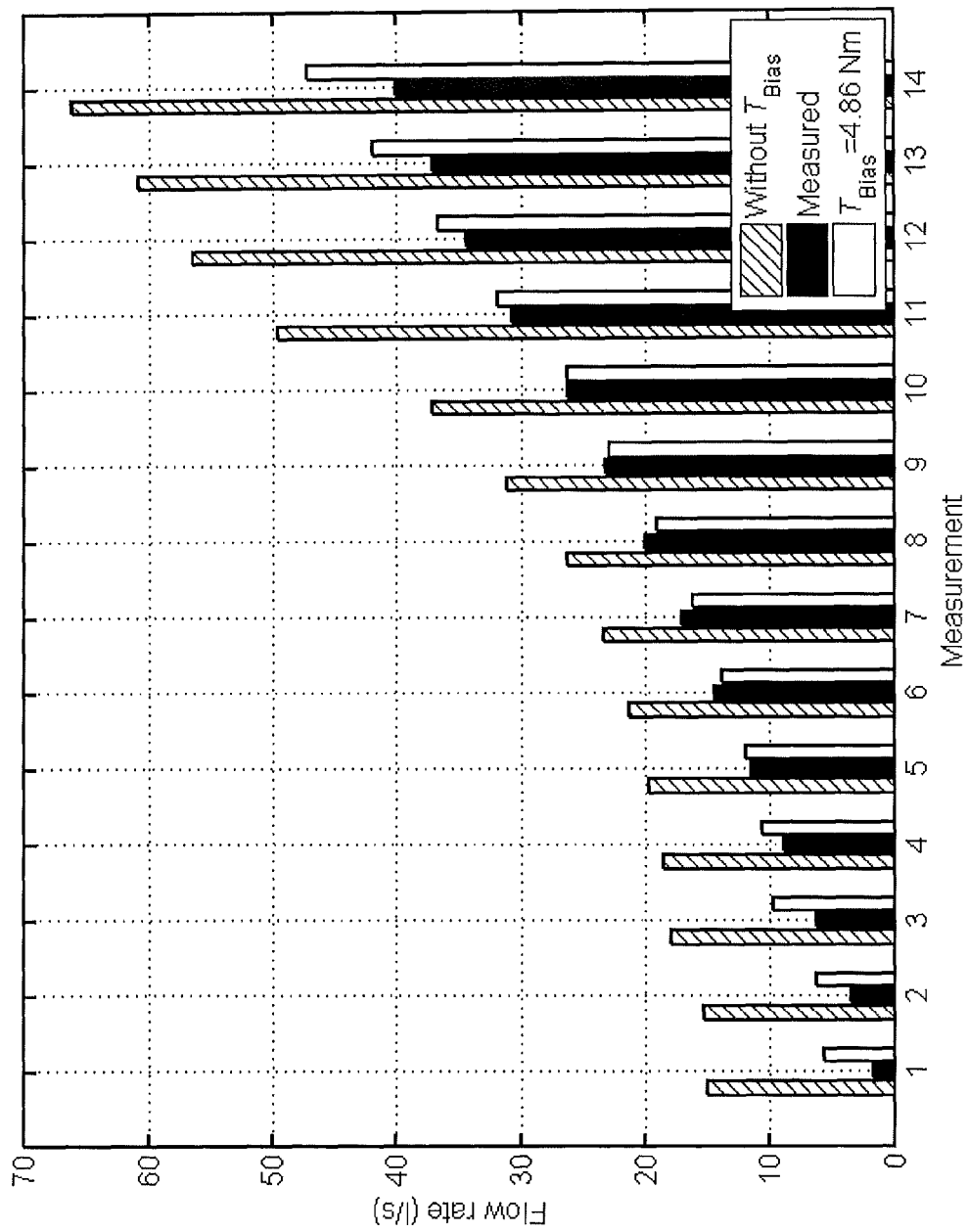
FIG. 4 shows estimated and measured flow rates in accordance with an exemplary embodiment of the present disclosure.

FIG. 4 shows estimated and measured flow rates in accordance with an exemplary embodiment of the present disclosure. The resulting flow rates for each measurement are illustrated in FIG. 4. As expected, estimation results can be erroneous without the $T_{Bias}$ correction. The use of $T_{Bias}$ for the shaft torque estimates has improved the estimation accuracy of the flow rate. Consequently, the improvement in the estimation accuracy of the pump flow rate also improves the estimation accuracy of the pump head. In FIG. 4, the estimated values without correction are the leftmost bars, the rightmost bars are the estimated values with the correction, and the middle ones are the measured results.

Figure 5:
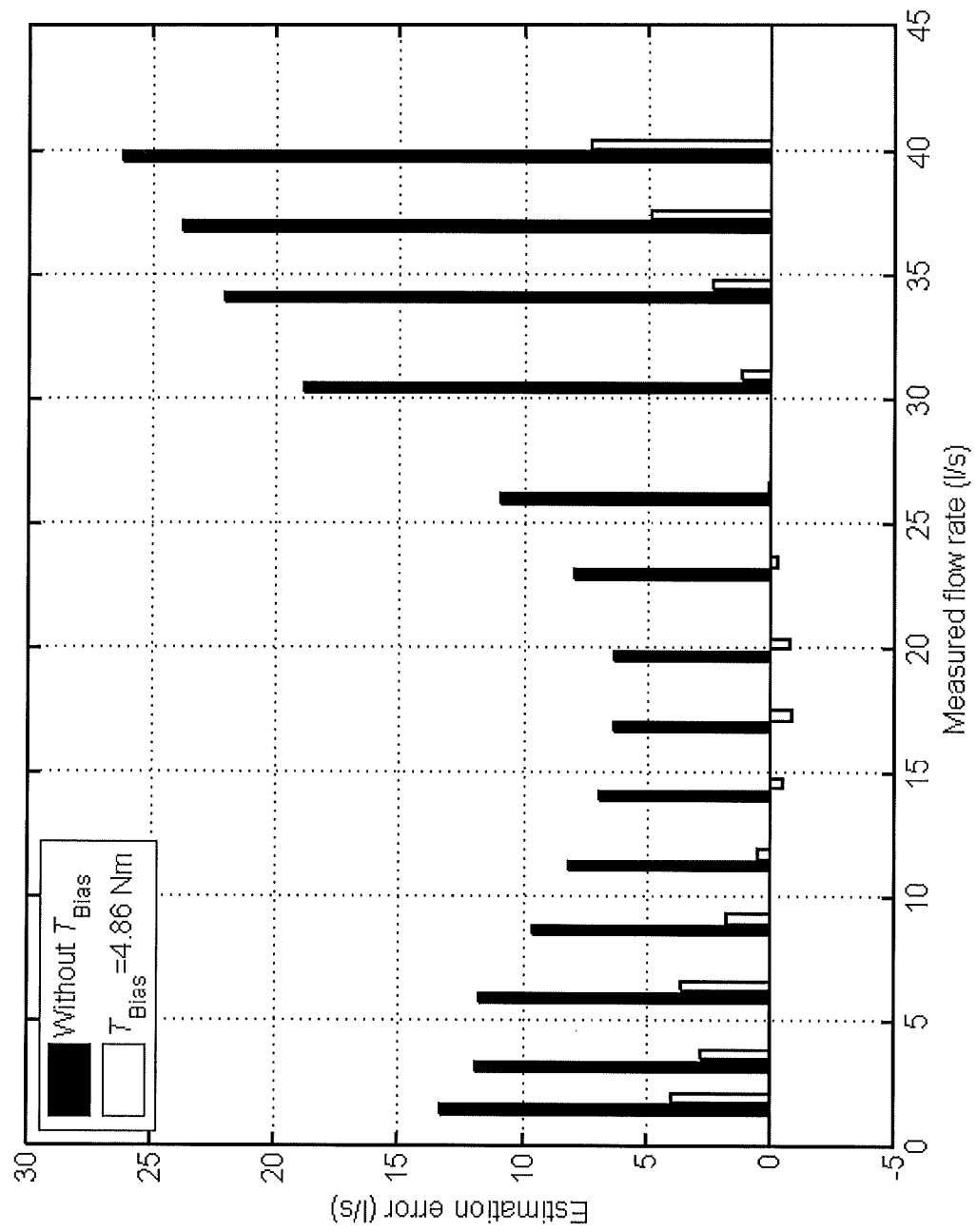
FIG. 5 shows estimation errors relating to the flow rates of FIG. 4 in accordance with an exemplary embodiment of the present disclosure.

FIG. 5 shows estimation errors relating to the flow rates of FIG. 4 in accordance with an exemplary embodiment of the present disclosure. Estimation errors were determined for both $T_{Bias}$ cases, and they are shown in FIG. 5. Without the $T_{Bias}$ correction (leftmost, longer bars), the estimation error of the flow rate is within, for example 26.2 l/s (≈94% of $Q_{VBEP}$) This means that the QT calculation can give unrealistic estimates for the flow rate. With the $T_{Bias}$ correction (rightmost, shorter bars), the estimation error of the flow rate is within, for example, 7.3 l/s, that is, approximately 26% of $Q_{VBEP}$. It should be noted that the estimation accuracy with $T_{Bias}$ correction is within, for example, 1.2 l/s, when the flow rate ranges, for example, from 11 l/s to 31 l/s (39-111% of $Q_{VBEP}$). It can be assumed that the pump is mostly operating within this operating region.

Laboratory measurements were also carried out by changing the rotational speed of the pump, while the valve settings affecting the process curve were untouched. In the first measurement series, the relative flow rate at nominal speed was 100% of the best efficiency flow rate 28 l/s, so the pump was operating at its best efficiency point. Measurements were carried out at rotational speeds ranging, for example, from 1020 rpm to 1620 rpm which correspond to 70% and 112% of the pump's nominal rotational speed, respectively.

Figure 6:
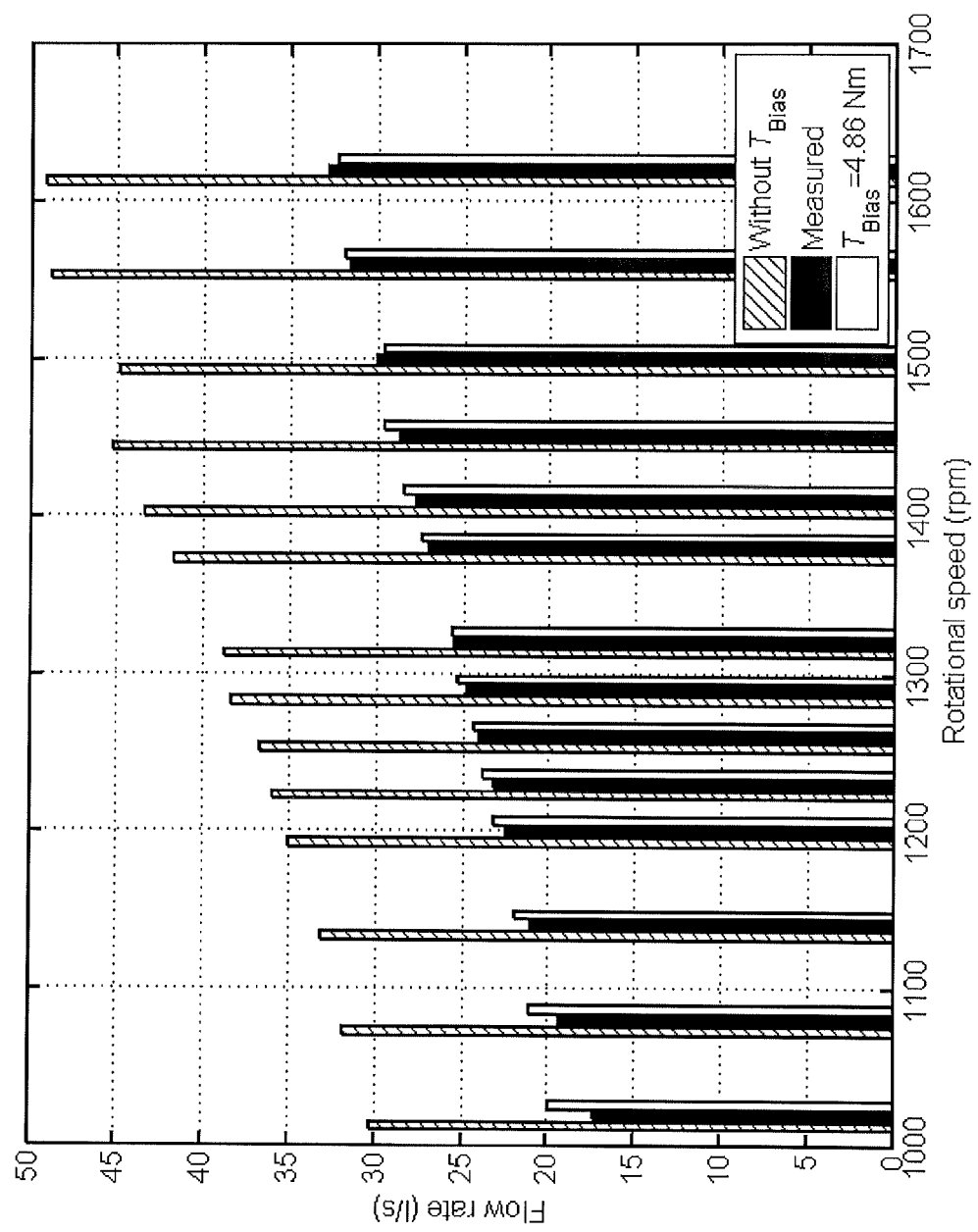
FIG. 6 shows estimated and measured flow rates near the pump's best efficiency point in accordance with an exemplary embodiment of the present disclosure.

FIG. 6 shows estimated and measured flow rates near the pump's best efficiency point in accordance with an exemplary embodiment of the present disclosure. The results of the estimations can be seen in FIG. 6. The estimation without the $T_{Bias}$ correction gives too high estimates for the flow rate (leftmost bars). The estimation with $T_{Bias}$ (rightmost bars) gives again significantly more accurate results compared with the estimations without $T_{Bias}$. The measured flow rates are shown as the middle bars in each set of results.

Figure 7:
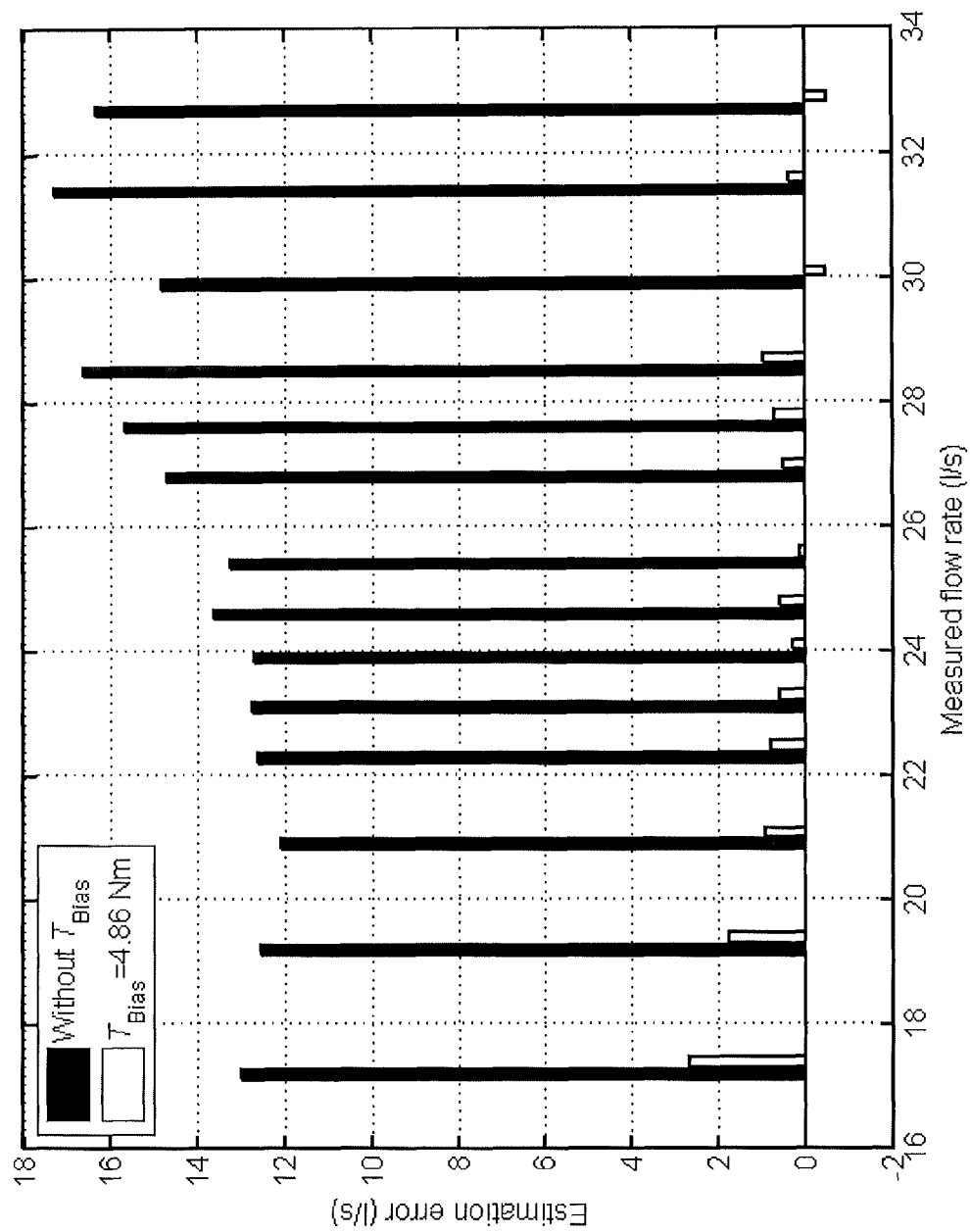
FIG. 7 shows estimation errors relating to the flow rates of FIG. 6 in accordance with an exemplary embodiment of the present disclosure.

FIG. 7 shows estimation errors relating to the flow rates of FIG. 6 in accordance with an exemplary embodiment of the present disclosure. The errors of the estimation methods can be seen in FIG. 7. The estimation error without the $T_{Bias}$ correction (longer bars) is within, for example, 17.3 l/s (≈62% of $Q_{VBEP}$). With $T_{Bias}$, the estimation error (shorter bars) is within, for example, 2.7 l/s (≈10% of $Q_{VBEP}$). This indicates that the estimation with $T_{Bias}$ improves the accuracy of QT calculation method significantly. It should also be noted that the estimation error of the $T_{Bias}$-improved QT calculation is within, for example, 1 l/s at the rotational speeds over 1140 rpm (i.e., flow rate is over 21 l/s in FIG. 7).

Figure 8:
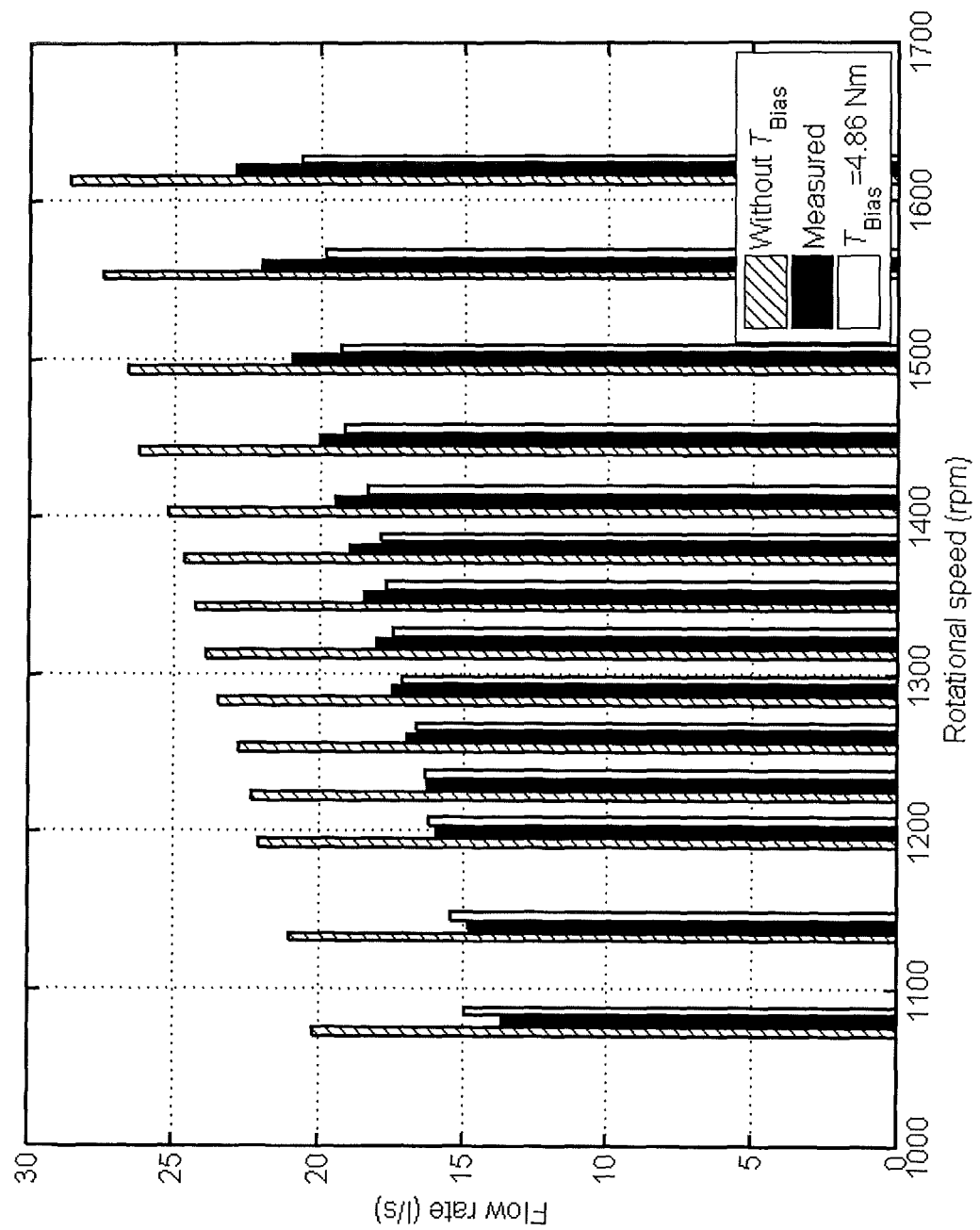
FIG. 8 shows estimated and measured flow rates when the pump was driven at a relative flow rate of 70% in accordance with an exemplary embodiment of the present disclosure.

In another exemplary embodiment, a measurement series was carried out at the relative flow rate of 70%. FIG. 8 shows estimated and measured flow rates when the pump was driven at a relative flow rate of 70% in accordance with an exemplary embodiment of the present disclosure. As shown in FIG. 8, the $T_{Bias}$ correction improves once again the estimation accuracy of the flow rate. Flow rates estimated with the correction are shown in the rightmost bars, measured flow rates are in the middle and estimated flow rates without the correction are the leftmost bars.

Figure 9:
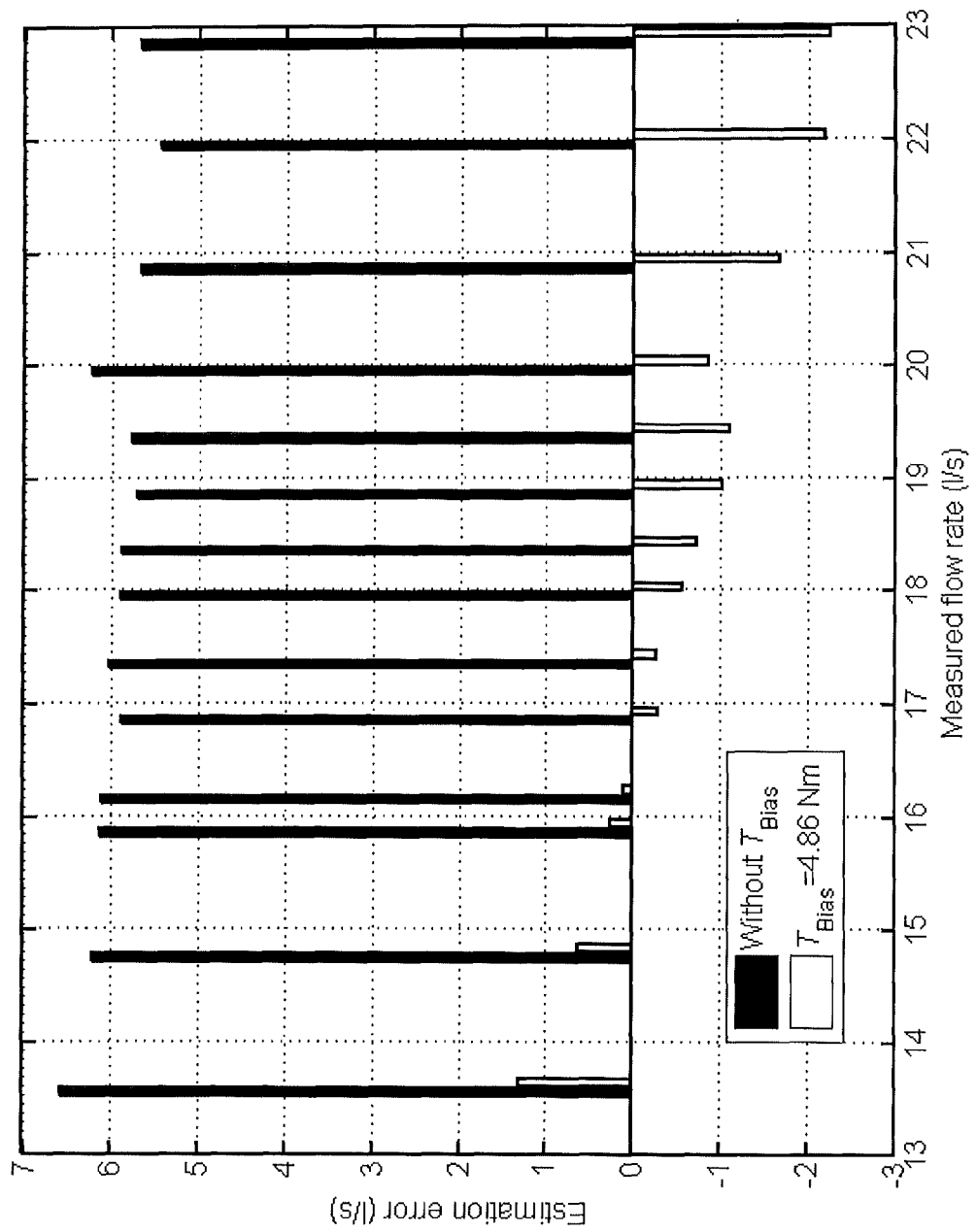
FIG. 9 shows estimation errors relating to the flow rates of FIG. 8 in accordance with an exemplary embodiment of the present disclosure.

FIG. 9 shows estimation errors relating to the flow rates of FIG. 8 in accordance with an exemplary embodiment of the present disclosure. As shown in FIG. 9, the estimation error without the $T_{Bias}$ correction (longer bars) is within, for example, 6.6 l/s (≈24% of $Q_{VBEP}$). With $T_{Bias}$ the estimation error (shorter bars) is within, for example, 2.3 l/s (8% of $Q_{VBEP}$).

The conducted measurements indicate that the estimation with $T_{Bias}$ improves the QT calculation method significantly, and the $T_{Bias}$ correction works both with static-speed (FIGS. 4 and 5) and variable-speed pumping applications (FIGS. 6 to 9).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method in connection with a pump driven with a frequency converter, comprising:
   a) measuring, in a measurement device, and storing a flow rate ($Q_{Mean}$) when the pump is in operation;
   b) storing a used rotational speed ($n_{Mean}$) and torque ($T_{Mean}$) of the pump during measurement of the flow rate ($Q_{Mean}$), which rotational speed and toque are estimated with the frequency converter; and
   in the frequency converter:
   c) determining from a characteristic curve that is transformed into stored rotational speed ($n_{Mean}$) a predetermined torque ($T_{Manufacturer}$) corresponding to the measured flow rate ($Q_{Mean}$);
   d) calculating a bias value of the torque ($T_{Bias}$) by comparing the predetermined torque of the characteristic curve ($T_{Manufacturer}$) and the stored torque ($T_{Mean}$) of the pump; and
   e) determining an operating point of the pump based on the bias value of the torque ($T_{Bias}$),
   wherein the bias value of the torque is transferred with an affinity law from the rotational speed ($n_{Mean}$) in which the bias value of the torque ($T_{Bias}$) was initially evaluated to an estimated rotational speed ($n_{est}$), and
   wherein the step of measuring and storing the flow rate comprises storing a time stamp of the measurement, and the step of storing the used rotational speed and torque comprises storing a time stamp of stored events for synchronizing the rotational speed and torque with the stored flow rate, and
   f) operating the pump with the frequency converter according to the determined operating point.

2. The method according to claim 1, wherein determining the operating point of the pump comprises:
   estimating torque ($T_{est}$) and the rotational speed ($n_{est}$),
   subtracting the bias value of the torque ($T_{Bias}$) from the estimated torque ($T_{est}$) to obtain the torque ($T_{UseForQCalculation}$) value used in a QT calculation.

3. The method according to claim 1, comprising:
repeating the steps a) to d) with differing flow rates, and calculating the bias value used in the determination of the operating point from bias values ($T_{Bias1}$, $T_{Bias2}$, $T_{Biasn}$) obtained with the differing flow rates.

4. The method according to claim 3, comprising:
calculating the bias value used in the determination of the operating point of the pump as a mean value of the calculated bias values ($T_{Bias1}$, $T_{Bias2}$, $T_{Biasn}$).

5. The method according to claim 3, wherein the bias values obtained with differing flow rates are used to provide linear correction to the estimated torque.

6. The method according to claim 1, comprising:
measuring the flow rate with a portable measurement device.

7. The method according to claim 1, wherein the steps of measuring and storing the flow rate comprise:
calculating a mean value of the flow rate.

8. The method according to claim 1, wherein the used rotational speed and torque are obtained from the frequency converter.

9. A method of calculating flow rate of a pump, comprising:
in a measuring device:
   a) measuring and storing a flow rate ($Q_{Mean}$) when the pump is in operation; and in a frequency converter:
   b) storing rotational speed ($n_{Mean}$) and torque ($T_{Mean}$) the pump during measurement of the flow rate ($Q_{Mean}$);
   c) determining a predetermined torque corresponding to the measured flow rate ($Q_{Mean}$);
   d) calculating a bias value of the torque ($T_{Bias}$) by comparing the predetermined torque of the characteristic curve ($T_{Manufacturer}$) and the stored torque ($T_{Mean}$) of the pump; and
   e) determining an operating point of the pump based on the bias value of the torque ($T_{Bias}$),
   wherein the bias value of the torque is transferred with an affinity law from the rotational speed ($n_{Mean}$) in which the bias value of the torque ($T_{Bias}$) was initially evaluated to an estimated rotational speed ($n_{est}$), and
   wherein the step of measuring and storing the flow rate comprises storing a time stamp of the measurement, and the step of storing the used rotational speed and torque comprises storing a time stamp of stored events for synchronizing the rotational speed and torque with the stored flow rate.

10. The method of claim 9, wherein the predetermined torque ($T_{Manufacturer}$) is obtained from a characteristic curve that is transformed into stored rotational speed ($n_{Mean}$).

11. The method according to claim 9, comprising:
repeating the steps a) to d) with differing flow rates, and calculating the bias value used in the determination of the operating point from bias values ($T_{Bias1}$, $T_{Bias2}$, $T_{Biasn}$) obtained with the differing flow rates.

12. The method according to claim 11, comprising:
calculating the bias value used in the determination of the operating point of the pump as a mean value of the calculated bias values ($T_{Bias1}$, $T_{Bias2}$, $T_{Biasn}$).

13. The method according to claim 11, wherein the bias values obtained with differing flow rates are used to provide linear correction to the estimated torque.

14. The method according to claim 9, comprising:
measuring the flow rate with a portable measurement device.

15. The method according to claim 9, wherein the steps of measuring and storing the flow rate comprise:
calculating a mean value of the flow rate.

16. The method according to claim 9, wherein the used rotational speed and torque are obtained from the frequency converter.

* * * * *